Patented Apr. 7, 1942

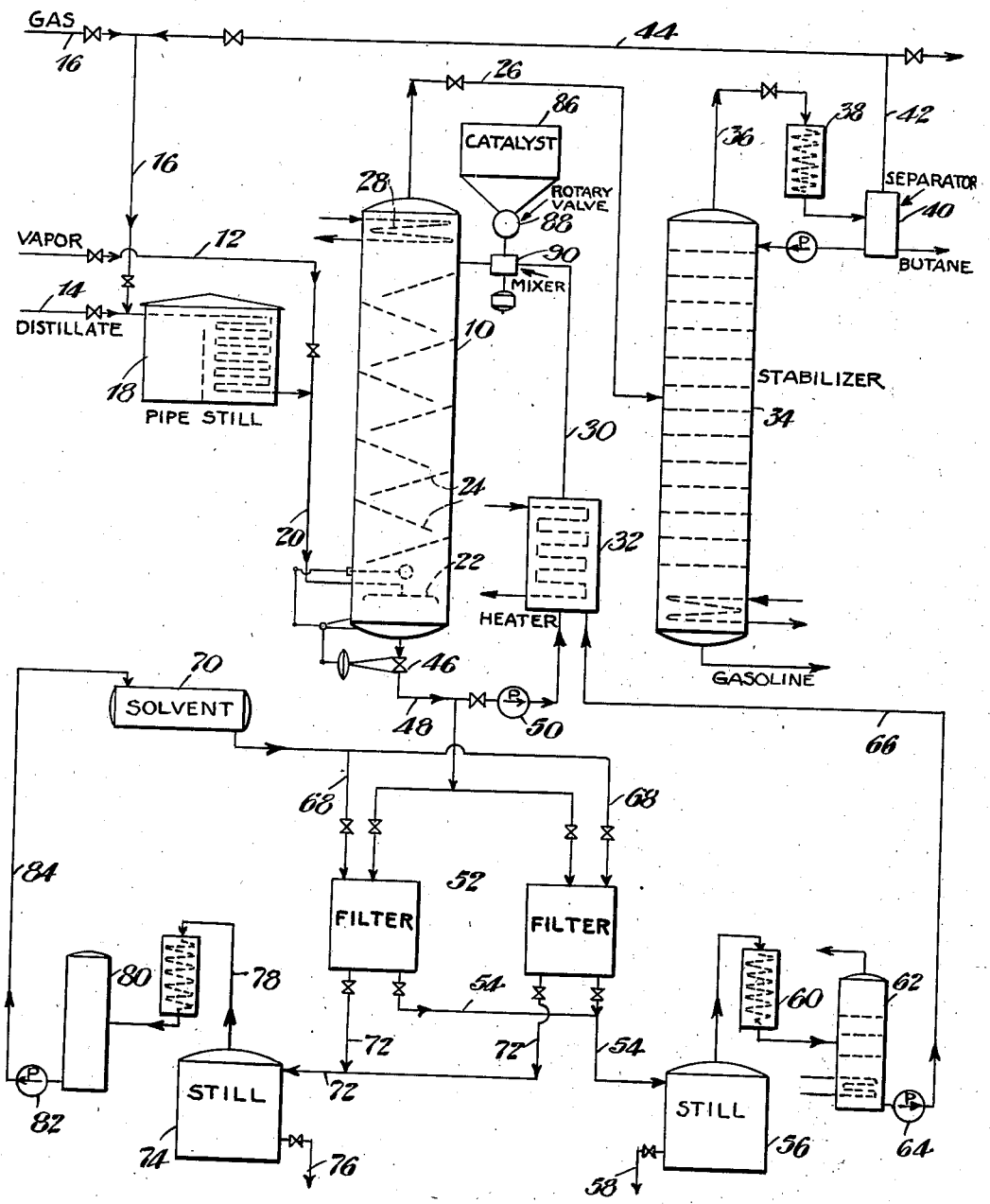

2,279,195

UNITED STATES PATENT OFFICE 2,279,195

REFINING CRACKED MOTOR FUEL DISTILLATES

Heinz Heinemann, Shreveport, La., assignor to Forward Process Company, Hillside, N. J., a corporation of Delaware Application October 28, 1939, Serial No. 301,741

4 Claims. (Cl. 196—36)

This invention relates to the refining of cracked mineral oil distillates, and is more particularly directed to an improved method for effecting catalytic refining treatment of motor fuel distillates to produce a motor fuel which is stable both as to color and gum formation under conditions of storage and use.

The mixture of low-boiling liquid hydrocarbons which make up the overhead distillate leaving the top of the fractionating tower of a petroleum cracking unit contains a considerable proportion of highly unsaturated hydrocarbons, some of which, when retained in a motor fuel, gradually polymerize to produce gums and resins and to impart an off-color to the motor fuel.

The primary object of the present invention is to provide a relatively simple, efficient and economical method of treating cracked petroleum motor fuel distillates in the vapor phase for the rapid selective polymerization and removal of gum-forming and color-imparting impurities.

Methods have been heretofore employed for refining cracked motor fuel distillates in which the distillate is contacted with catalyst such as carbon, fuller's earth, sulphuric acid and aluminum chloride. Catalysts of the type referred to act on the distillate to polymerize gum-forming and color-imparting impurities into high-boiling gum and resin products which can be separated from the motor fuel distillate vapors by fractional condensation. Treatment of cracked distillates in the vapor state with finely divided solids such as carbon, fuller's earth or aluminum chloride has heretofore involved contacting the vapors with either a stationary bed of the catalyst or with a counter-current shower of the catalyst in a gaseous-vapor atmosphere. Treatment of the distillate in this manner has involved rather expensive equipment, high labor costs, and low treating efficiency of the catalyst and consequent high material cost, largely because of the rapidity with which the catalyst is rendered inactive by adsorption on its surfaces of the heavy resin and gummy polymer products of the treatment. Treatment of the distillate with sulphuric acid and similar corrosive liquids is also costly and troublesome as to equipment demands and from the standpoint of material costs, since such treatment must be followed with separation of the acid from the distillate, neutralization of the distillate with alkali, and redistillation or other purification treatment. Furthermore, treatment with acid inevitably causes polymerization of some original unsaturated components of the distillate having properties for antiknock suppression or the like which makes their removal from the distillate by the treatment disadvantageous.

The method of treatment which forms the subject of the present invention rests in part on the observation that when the mixture of gases and vapors which forms the overhead fraction of a petroleum cracking unit is contacted with a finely divided solid catalyst such as aluminum chloride or phosphoric anhydride (phosphorous pentoxide) at a temperature in the neighborhood of 400–420° F., the resulting reaction produces heavy gum and resin polymers and also a high-boiling oily polymer having properties of stability and relatively low viscosity such as to make its use advantageous as a liquid carrier for the finely divided catalyst in the refining treatment.

This oily polymer is sufficiently effective as a solvent for the heavy gum and resin polymers and as a wetting medium for the solid catalyst to at least partially inhibit deposition of the gum and resins on the catalyst surface and to inhibit hydration of the catalyst, thereby greatly increasing the active life of the anhydrous catalyst when used in liquid suspension in the oily polymer for refining the cracked petroleum distillates in the vapor phase at the approximate temperature above specified.

The method of treatment which forms the subject of the present invention may therefore be summarized broadly as that of effecting intimate contact of vapors of crude gasoline hydrocarbon products of a mineral oil cracking operation at a temperature in the range 350°–450° F. and under moderate pressure (say 0–250 lbs. gauge) with a countercurrent liquid suspension or slurry of the finely pulverized solid catalyst in an oily polymer product of the treatment. The method further contemplates continuous recirculation of the catalyst-oil slurry treating reagent and control of the operating temperatures, pressures, and contact period within the reaction zone to insure selective polymerization of the undesirable gum-forming and color-imparting components and separation of the resulting gum and resin polymers from the treated gasoline vapors within the zone of the treating reaction.

With the above and other objects and features in view, the invention consists in the improved method of refining cracked mineral oil distillates which is hereinafter described and more particularly defined in the following claims.

For a more particular description of the invention, reference may be had to the accompanying diagrammatic flow sheet illustrating a preferred layout of apparatus for carrying out the process.

Referring more particularly to the drawing, numeral 10 designates a cascade baffle treating tower within which a crude motor fuel distillate product of a petroleum cracking operation may be contacted in vapor phase with a colloidal suspension or slurry of very finely divided anhydrous solid catalyst suspended in an oily polymer prodsolid catalyst suspended in an oily polymer product of the treating operation. It is usually desirable to treat directly within tower 10 a mixture of hot cracked hydrocarbon vapors and gases leaving the top of the fractionating tower of a cracking unit through line 12. The process is also applicable to the treatment of unrefined liquid cracked distillate which may be taken from a line 14, admixed with cracked hydrocarbon gas supplied from a line 16, and passed through a pipe still 18 for practically complete vaporization of the distillate. The cracked distillate vapors pass from the line 12 or from the pipe still 14 through a line 20 into a distributor 22 at the base of tower 10. The distributor 22 is preferably located below the level of a body of the liquid treating agent above referred to (i. e. the colloidal suspension of the catalyst in the oily polymer), so that in passing from the bottom to the top of tower 10, the preferred mixture of cracked vapors and gases is intimately contacted first with a relatively stationary body of the liquid catalyst suspension and thereafter with moving streams of the treating liquid flowing downwardly from the top of the tower over cascade baffles 24. Suitable temperature control is maintained on the mixture of vapors and gases entering the base of tower 10 through pipe 20, and by insulating the tower 10, to insure the maintenance of a substantially uniform temperature throughout the length of the tower in the preferred treating range of approximately 350–450° F. By means of pressure control valves in the line 12 and in vapor line 26 leading off from the top of the tower 10, pressure within the tower 10 during the treatment is preferably maintained at 50 to 250 pounds per square inch. To assist in temperature control, a heat interchanger 28 is located in the top of the tower.

From the treating tower 10 the treated gas and vapor mixture exits through vapor line 26 into a stabilizing column 34. As the vapors enter the column 34 they may be fractionally condensed either under the pressure maintained in tower 10 or under reduced pressure, in order to promote effective separation of the desired motor fuel product from undesired butane and gaseous residues. The refined motor fuel is drawn off as a liquid gasoline from the base of column 34, while the butane and fixed gases pass overhead through a vapor line 36 into a condenser 38, wherein the butane and any higher boiling hydrocarbons are liquefied and may be either returned to the top of the column 34 as reflux, or withdrawn from a separating tank 40 located at the discharge end of the condenser. Uncondensed gases are removed from tank 40 through line 42, and part of these gases may be recirculated through pipe 44 and thence through line 16 and pipe still 18.

A predetermined depth of the oily suspension of the catalyst is preferably maintained in the base of tower 10 by means of an automatic float control valve 46 located in an offtake pipe 48 leading out of the base of tower 10. Any part or all of the catalyst slurry removed from the base of tower 10 past valve 46 may be recirculated immediately by means of a pump 50 through heater 32 and line 30; and part of the slurry may be passed through one of a pair of filters 52 for the purpose of separating from the oily carrier all solid catalyst particles. The filters 52 are provided for alternate operation, with a view of collecting and revivifying both the catalyst which is employed for the treatment and the oily polymer carrier for the catalyst.

After passing through one of the filters 52, the oily carrier may be conducted by draw-off pipes 54 into a batch still 56, wherein the carrier oil is subjected to distillation to separate it from any high boiling gum and resin polymer which remains in the still as a residue to be drawn off at 58. The vaporized oily polymers taken off overhead from still 56 pass through a condenser 60 into a fractionating unit 62, wherein separation may be effected between the oily polymers and any lower boiling hydrocarbons which it may be desirable to separate from the oily polymer at this point. The purified oily polymer thus collected at the base of unit 62 may then be recirculated by a pump 64 and a line 66 through heater 32, and thence into the top of tank 10 through charging pipe 30.

The spent catalyst which is collected in filters 52 may be revivified by introducing via lines 68 a charge of gum and resin solvent through the filter from a solvent supply tank 70. The solvent solution of gum and resin is withdrawn from the filters 52 through lines 72 into a batch still 74, within which separation of solvent and gum and resin polymers is effected; the gum and resin polymers being collected and withdrawn from the still as a residue through pipe 76. The vaporized solvent leaves the still 74 through an overhead vapor line 78 and is condensed and trapped in a collecting tank 80 from which it is returned to the solvent tank 70 by means of a pump 82 and return pipe 84.

In order to refortify the slurry, dry powdered fresh catalyst is added to the recycle oily polymer from a catalyst storage bin 86 at a rate controlled by a rotary valve 88. A motor driven mixer 90 is provided for mixing the catalyst and recycled polymer oil. Catalyst which has been revivified by washing with gasoline, naphtha or other solvent circulated through filters 52, may be dried and charged to bin 86 for recirculation through tower 10.

Because of the fact that the powdered catalyst is carried in colloidal suspension in an oily polymer product of the treatment throughout the period of contact of the catalyst with the cracked petroleum vapors and gases in the tower 10, the active life of the catalyst is materially prolonged over what it would be if the hydrocarbon vapors and gases were contacted with the catalyst in a dry state. For example, as many as 16 to 18 barrels of motor fuel distillate can be effectively refined with one pound of finely divided phosphorous pentoxide by the process herein described, before the catalyst becomes spent. Probably this is chiefly the result of the solvent properties of the oily polymer with respect to the gum and resin products of the polymerizing reactions which take place within the tower, and the selective wetting effect of the oily polymer for the catalyst, thereby affording protection by the oily polymer against hydration of the catalyst and deposition upon and clogging of the surface of the catalyst by the gum and resin products of the treatment.

Because of the prolonged active life of the catalyst under the conditions of treatment as practiced in tower 10, it has been found possible and desirable to continuously recirculate part of the oily polymer-catalyst slurry from the base of the tower 10 back through a heater 28 into the top of the tower through a charging line 30. While the cracked gases and distillate vapors are passing upwardly through the tower 10, ample time of contact of the vapors with the oily polymer catalyst suspension is afforded to effect the necessary polymerization of the undesirable gum and resin-forming and color-imparting components present in the original vaporized distillate.

While the process forming the subject of the present invention is directed generally to the refining treatment of motor fuel distillates by contacting such distillates in vapor state with a liquid slurry of finely divided solid catalyst suspended in an oily polymer product of the treatment at a temperature in the range of 350–500° F. and a pressure of 0–250 lbs. gauge, for the purpose of removing gum-forming and color-imparting impurities, there are certain advantages which result from a preferential choice of the catalyst, temperature and pressure employed in the treatment. For example, by holding the treating zone under a pressure near the top of the specified range, it is possible to carry out a more efficient stabilizing treatment of the refined distillate within the stabilizing tower 34. Furthermore, with suitable control of the temperature and pressure within the treating tower 10, the refining operation can be combined with fractional separation of the vapors under treatment and of the products of the treatment into an overhead motor fuel distillate and a residual mixture of higher boiling fractions of the original distillate treated together with polymer and resin products of the treatment. Employment of a preferred treating catalyst comprising anhydrous phosphorus pentoxide suspended in relatively high boiling oily polymer product of the treatment is highly effective with respect to the primary refining objective of the process, and also produces a refined 400° F. end point motor fuel having a volume greater than the volume of the motor fuel fraction of corresponding distillation range which was originally present in the crude distillate subjected to the treatment. This increase in yield of hydrocarbons boiling in the motor fuel range is the result both of polymerization of low boiling unsaturated hydrocarbons and of alkylation reactions between the unsaturated gaseous hydrocarbons and low boiling liquid hydrocarbons present in the cracked distillate under treatment.

The preferred treating agent consists of phosphoric anhydride (phosphorus pentoxide) ground to a fineness such as will pass a screen of 200 mesh to the square inch, suspended in an oily polymer product of the treatment having an initial boiling point of approximately 460° F. and a gravity of approximately 23° A. P. I. The slurry is preferably made up in the proportions of about one pound of phosphoric anhydride suspended in about one and one quarter gallons of the oily polymer. However, the phosphoric acid component of the slurry may be replaced in part by finely divided carbon, and the oily polymer carrier may range in gravity between 22 and 30° A. P. I. and an initial boiling point between 400 and 460° F. In order to afford intimate contact of the gas and vapors with the slurry throughout the length of the tower 10, the lower edge of each of the cascade baffles is preferably serrated to better insure a uniform distribution of the slurry over the width of the bottom edge of each baffle.

It has been found that no additional refining treatment of the distillate vapors which are taken off the top of the treating tower 10 is necessary, other than the fractional condensation and stabilization previously described as taking place within the fractionating column 34 and separator 40. The refined motor fuel is gum stable, sweet, and has a good color.

That the motor fuel which is obtained by this process is stable under conditions of storage and use is indicated by the following characteristics which were obtained by treating a yellow pressure distillate having a distillation end point of approximately 480° F., and containing approximately 79% of 410° F. end point motor fuel constituents. After treatment of this yellow pressure distillate in accordance with the preferred process outlined above, the refined distillate taken off the bottom of the separator 40 had a color of 29 Saybolt after exposure to sunlight. Whereas, the original yellow pressure distillate subjected to the treatment had a potential gum content of 800 milligrams of residue per 100 cc. by the copper dish method, the treated distillate removed from the separator 40 had a potential gum content of approximately 100 milligrams of residue per 100 cc. on evaporation of 100 cc. of the gasoline in an inert atmosphere, after exposure to an atmosphere of oxygen at 100 lbs. initial pressure and at a temperature of 212° F. for a period of four hours.

The process of the present invention has proven not only effective for removal of gum forming and color imparting impurities, but is also efficient from the standpoint of detonating and distillation characteristics of the motor fuel product. This is shown by the fact that treatment of the yellow pressure distillate above referred to by the present method, yields a motor fuel product having a higher octane number than the motor fuel fraction of the same pressure distillate when refined by the usual refining methods.

Having thus described the invention, what is claimed as new is:

1. In a process for removing gum-forming constituents from cracked motor fuel distillates, the steps comprising continuously passing such distillates in vapor phase through a baffled contact treating chamber, contacting the distillate vapors in said chamber with a counterflow stream of liquid slurry of finely divided anhydrous phosphorus pentoxide catalyst suspended in an oily polymer product of the catalytic treatment, maintaining the temperature in said chamber in the range 350°–450° F., throughout the period of contact to prevent substantial condensation of distillates under treatment while promoting separation from the vapors of high boiling polymer products of the treatment, removing refined treated distillate in the vapor state from said chamber, removing from another part of said chamber the oily polymer catalyst slurry in admixture with high boiling polymer products, recycling part of the polymer-catalyst slurry back to the chamber, separating oily polymer from the other part of the polymer-catalyst slurry by filtration and solvent extraction to revivify the catalyst, distilling the separated oily polymer to obtain a high boiling fraction free of heavy tarry material, utilizing the high boiling fraction and the revivified catalyst to make up finely divided catalyst slurry and mixing the revivified catalyst slurry with the recycled catalyst slurry.

2. The process as defined in claim 1, in which the slurry consists of phosphorous pentoxide suspended in a high boiling oily polymer product of the treatment in the proportions of one pound of the solid to about one to one and one-half gallons of the oil.

3. The process as defined in claim 1 in which the slurry consists of solid catalyst particles of not to exceed 200 mesh size suspended in an anhydrous oily polymer of about 460° F. initial boiling point and approximately 23.5 A. P. I. gravity.

4. The process of refining cracked motor fuel distillates which comprises, passing vapors of such distillates in admixture with unsaturated hydrocarbon gases upwardly through a treating zone in intimate contact with a counterflow stream of slurry of oily polymer product of the treatment carrying finely divided anhydrous phosphorus pentoxide in suspension therein, controlling the pressure and temperature and time of contact in the treating zone to promote efficient polymerization of gum-forming and color-imparting impurities and to effect fractionation separation of products having a boiling point above the motor fuel range from the refined motor fuel distillate vapors withdrawn from the top of the treating zone separating oily polymer from the catalyst by filtration and solvent extraction to revivify the catalyst, distilling the separated oily polymer to obtain a high boiling fraction free of heavy tarry material and utilizing the high boiling fraction and the revivified catalyst to make up said finely divided catalyst slurry being supplied to the process.

HEINZ HEINEMANN.